United States Patent
von Orelli

(10) Patent No.: US 8,334,978 B2
(45) Date of Patent: Dec. 18, 2012

(54) METHOD AND HAND-HELD COLOR MEASUREMENT DEVICE FOR GAUGING A COLOR MEASUREMENT CHART

(75) Inventor: Adrian von Orelli, Zurich (CH)

(73) Assignee: X-Rite Europe GmbH, Regensdorf (CH)

( * ) Notice: Subject to any disclaimer, the term of this patent is extended or adjusted under 35 U.S.C. 154(b) by 392 days.

(21) Appl. No.: 12/641,047

(22) Filed: Dec. 17, 2009

(65) Prior Publication Data

US 2010/0220314 A1   Sep. 2, 2010

(30) Foreign Application Priority Data

Dec. 18, 2008 (EP) .................................... 08172176

(51) Int. Cl.
*G01J 3/46* (2006.01)
(52) U.S. Cl. ........................................................ 356/402
(58) Field of Classification Search .................... 356/402
See application file for complete search history.

(56) References Cited

U.S. PATENT DOCUMENTS

| | | | |
|---|---|---|---|
| 4,505,589 A | | 3/1985 | Ott et al. |
| 2002/0005950 A1 * | | 1/2002 | Beimers et al. ............... 356/402 |
| 2002/0054292 A1 | | 5/2002 | Orelli et al. |
| 2003/0169421 A1 | | 9/2003 | Ehbets |
| 2003/0202183 A1 * | | 10/2003 | Beimers et al. ............... 356/402 |
| 2005/0012948 A1 * | | 1/2005 | Gotoh et al. .................. 358/1.9 |
| 2007/0086009 A1 * | | 4/2007 | Ehbets et al. ................. 356/402 |
| 2008/0174763 A1 * | | 7/2008 | Ehbets et al. ................. 356/327 |

OTHER PUBLICATIONS

European Search Report dated May 18, 2009 (English translation not available).

* cited by examiner

*Primary Examiner* — Kara E Geisel
(74) *Attorney, Agent, or Firm* — McCarter & English, LLP

(57) ABSTRACT

In a method for gauging a color measurement chart which includes at least one row of color measurement fields, a handheld color measurement device is moved over the color measurement fields and gauges the color measurement fields. The measurement device is guided over the color measurement fields in two measurement runs. In a first run, first color measurement data is measured using a first type of illumination light (typically, white), covering a sufficient portion of the spectrum to enable the fields to be identified by means of the first color measurement data, and the fields are identified on the basis of the first color measurement data. In a second run, second color measurement data is measured using a second type of illumination light (typically, UV), and is then assigned to the color measurement fields on the basis of the fields identified in the first run.

14 Claims, 2 Drawing Sheets

METHOD AND HAND-HELD COLOR MEASUREMENT DEVICE FOR GAUGING A COLOR MEASUREMENT CHART

FIELD OF THE INVENTION

The invention relates to a method for gauging a color measurement chart which includes at least one row of adjacently arranged color measurement fields, using a hand-held color measurement device which is moved over the color measurement fields in the row and gauges the color measurement fields in a multitude of individual measurements, and to a hand-held color measurement device, designed for scanning operations, for colourmetrically gauging the color measurement fields of a color measurement chart, wherein in said scanning operations, the hand-held color measurement device is guided over a row of color measurement fields of the color measurement chart and automatically takes a multitude of individual measurements.

BACKGROUND OF THE INVENTION

In order to be able to correctly assess the effect of the brightener in paper for different spectral distributions of the target observation illumination, measuring methods are currently known for example from the documents EP 1 775 565 B1 and European patent application No. 07 110 191.9 of Jun. 13, 2007 (corresponding to U.S. patent application Ser. No. 12/136,373 of Jun. 10, 2008) in which two measurements are taken using different illumination spectra, and the resulting measurement values are evaluated on the basis of a mathematical or physical model. The measuring methods described in these documents are based on a measurement using a white illumination and a subsequent measurement using an exclusively UV illumination.

Color measurement charts which are usually referred to as test charts are used for color management applications. Such color measurement charts or test charts normally include a two-dimensional arrangement of color measurement fields; in the simplest case, however, a test chart can also consist of a single row of color measurement fields, wherein in most cases, this is then referred to as a color measurement strip. Various hand-held color measurement devices for gauging such test charts (in rows and/or lines) during scanning operations are known, for example the devices "i1" and "ColorMunki" of X-Rite Europe GmbH, Regensdorf, Switzerland. Other hand-held color measurement devices for scanning operations are described in all their details in the documents WO 2006/117598 A1, U.S. Pat. No. 7,345,763 B2 and U.S. Pat. No. 6,590,648 B1.

When gauging test charts during scanning operations, for example by means of the cited known devices "i1" or "ColorMunki", the hand-held color measurement device is preferably guided over a respective row of the color measurement fields on the test chart by means of a mechanical guide, wherein a multitude of individual measurements are automatically taken consecutively, at short intervals. The position of the color measurement fields on the test chart is ascertained from the spectral measurement data by evaluating the differences between the measurement values of the consecutive measurements. A detailed explanation is for example to be found in the document U.S. Pat. No. 6,590,648 B1. This method requires that measurement values between adjacent color fields do not fall below a minimum color difference. Furthermore, color measurement devices are also known, for example from the document U.S. Pat. No. 7,345,763 B2, which are already suitable for scanning operations and comprise an integrated distance measurement sensor which determines the position of the color measurement device during the scanning process. The knowledge of the position of the device during each individual measurement can then be adduced as an aid to identifying the measurement fields.

If an exclusively UV illumination is used in a measuring process, a sufficient difference in the reflection of the adjacent color fields in the UV range is required in order to determine the position of the measurement fields from the measurement data. However, this means a massive restriction in the configuration of the test chart.

SUMMARY OF THE INVENTION

The present invention is intended to eliminate the problem, when gauging a color measurement chart, of identifying fields using illuminations which only include a limited portion of the spectrum, in particular only the UV range. wherein the arrangement of the color measurement fields of the color measurement chart (test chart) is not to be in any way restricted with respect to its reflection properties in the relevant limited portion of the spectrum.

This object, on which the invention is based, is solved by: a method for gauging a color measurement chart which includes at least one row of adjacently arranged color measurement fields, using a hand-held color measurement device which is moved over the color measurement fields in the row and gauges the color measurement fields in a multitude of individual measurements, wherein: the hand-held color measurement device is guided over the color measurement fields in the row in two measurement runs; in a first measurement run, first color measurement data of the color measurement fields is measured using a first type of illumination light, and the fields are identified on the basis of the first color measurement data, wherein the first type of illumination light covers a sufficient portion of the spectrum to enable the fields to be identified by means of the first color measurement data; and in a subsequent second measurement run, second color measurement data of the color measurement fields is measured using a second type of illumination light which does not cover a sufficient portion of the spectrum for identifying the fields, and the second color measurement data is assigned to the color measurement fields on the basis of the fields identified in the first measurement run; and by a hand-held color measurement device, designed for scanning operations, for colourmetrically gauging the color measurement fields of a color measurement chart, wherein in said scanning operations, the hand-held color measurement device is guided over a row of color measurement fields of the color measurement chart and automatically takes a multitude of individual measurements, said hand-held color measurement device comprising: an illumination array for exposing the color measurement chart to a first and a second type of illumination light; a pick-up array for capturing the measurement light reflected back from the color measurement fields; a converter array which converts the captured measurement light into corresponding electrical signals; an evaluation array which forms digital color measurement data from the electrical signals; and an electronic controller for the individual measurements and the illumination array and for identifying the color measurement fields from the color measurement data, wherein the first type of illumination light covers a sufficient portion of the spectrum to enable the color measurement fields to be identified from the color measurement data, and the second type of illumination light does not cover a sufficient portion of the spectrum for identifying the fields, wherein the controller is designed to gauge the color measurement fields using the first type of illumination light and identify the color measurement fields from first color measurement data thus obtained, during a first measurement run in which the hand-held color measurement device is guided over a row of color measurement fields in a first direction, and to gauge the color measurement fields using the second type of illumination light and determine second color measurement data and assign the second color measurement data to the color measurement fields on the basis of the color measurement fields identified in the first measurement run, during a subsequent second measurement run in which the hand-held color measurement device is guided over the row of color measurement fields in a second direction. Developments and particularly advantageous embodiments of the method in accordance with the invention and the hand-held color measurement device in accordance with the invention are referred to in the subject of the application.

In accordance with the main concept of the invention, each row of color measurement fields is scanned twice within the framework of two measurement runs, once using illumination light having a spectral coverage which is sufficient for identifying the color fields on the basis of the color measurement data, and once using illumination light of the restricted spectral range of interest, specifically UV light, wherein it is particularly expedient and advantageous to scan the respective rows of color measurement fields in two mutually opposite directions. In the first measurement run, the color measurement fields and their positions are determined, and in the second measurement run, the measurement data obtained in said second measurement run is assigned to the color measurement fields on the basis of the positions of the color measurement fields as ascertained in the first measurement run.

BRIEF DESCRIPTION OF THE DRAWINGS

In the following, the method in accordance with the invention and the hand-held color measurement device in accordance with the invention are explained in more detail on the basis of the drawings.

DETAILED DESCRIPTION

Figure 1:
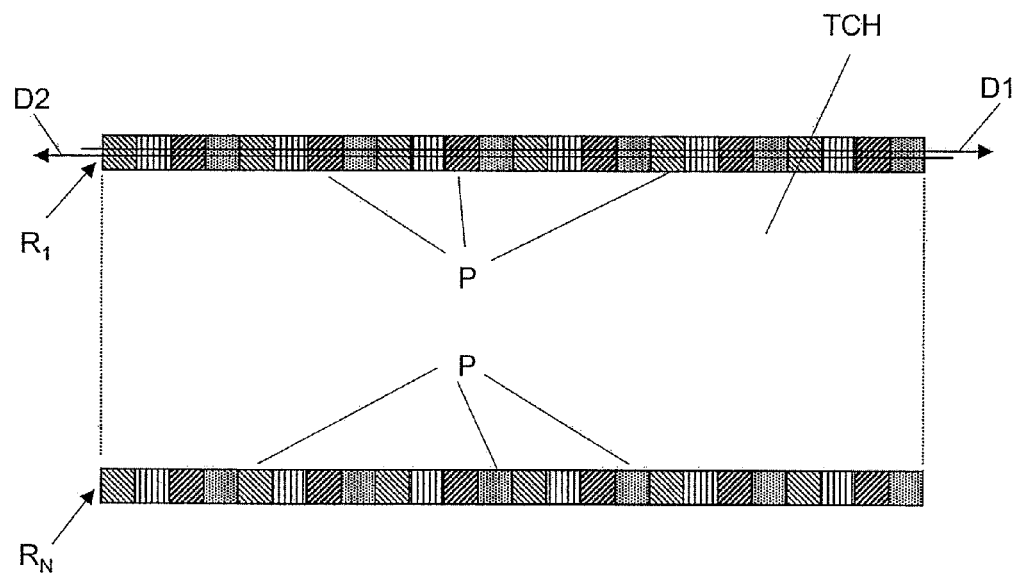
FIG. 1 shows a schematic sketch of a typical color measurement chart.

An example of a color measurement chart, usually referred to as a test chart, is shown in a somewhat simplified representation in FIG. 1. The color measurement chart TCH includes a number of rows of measurement fields $R_1 \ldots R_N$ which each contain a number of adjacently arranged color measurement fields P. The color measurement chart TCH is gauged in rows, wherein in accordance with a first important aspect of the invention, each of the rows $R_1 \ldots R_N$ is scanned twice, in mutually opposite directions D1 and D2, respectively, and under different measurement conditions. Details in this respect will be discussed further below.

Figure 2:
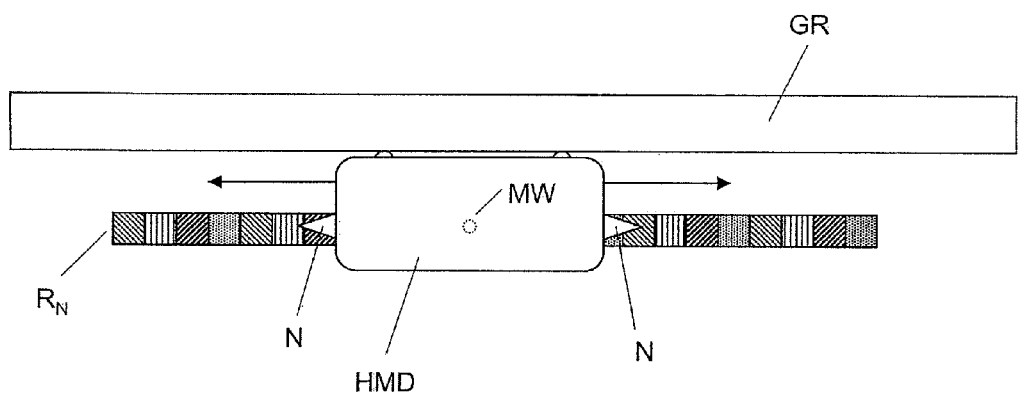
FIG. 2 shows a schematic representation of the hand-held color measurement device being used to gauge a color measurement chart.

FIG. 2 shows a typical measurement configuration for scanning a row of color measurement fields $R_N$. A hand-held color measurement device HMD is positioned over the row of color measurement fields $R_N$ such that its measurement window MW comes to rest on the row of color measurement fields to be gauged, wherein two nibs N on the hand-held color measurement device HMD serve as an alignment aid. The hand-held color measurement device HMD physically abuts a guiding rail GR which is aligned parallel to the row of color measurement fields and serves as a guide for the hand-held color measurement device. The hand-held color measurement device HMD is designed for scanning operations in a way which is known in its own right, i.e. it can automatically take a multitude of individual measurements at short intervals while it moves along the row of color measurement fields and thus respectively gauge an entire row of color measurement fields at a plurality of respective points per color measurement field. The two nibs N are to be understood purely as examples; other aligning aids can of course also be provided, or can also be omitted.

Figure 3:
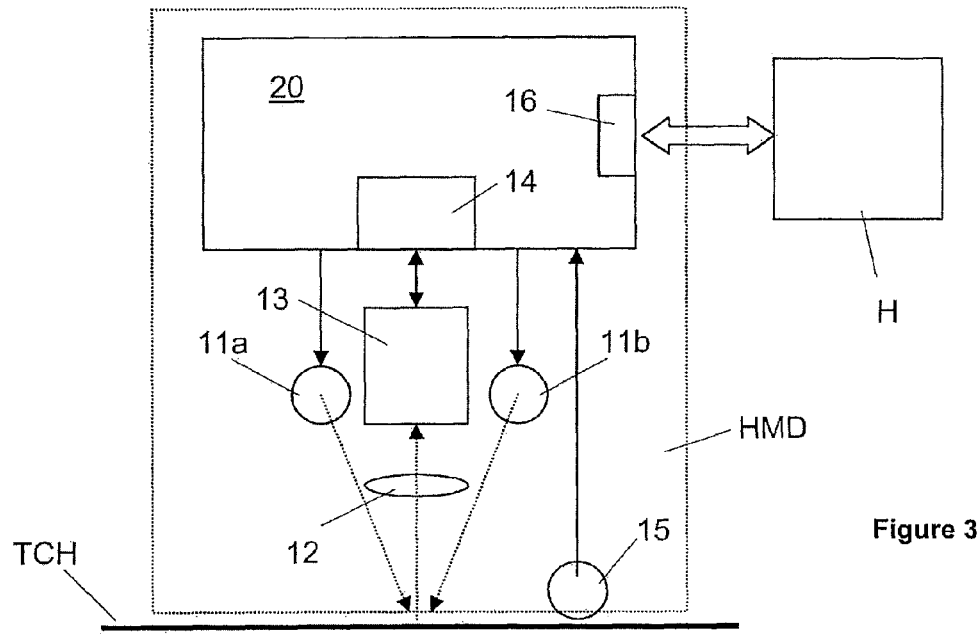
FIG. 3 shows a schematic diagram of the most important components of the hand-held color measurement device.

FIG. 3 shows the most important functional components of the hand-held color measurement device in accordance with the invention. It includes, within a device housing (not shown), an illumination array 11a-11b for selectively exposing the measurement object (the color measurement fields P) to two different types of illumination light, a pick-up array 12 for capturing the measurement light reflected back from the measurement object (the color measurement fields P), a converter array 13 for splitting the measurement light into specific wavelengths and converting these into corresponding electrical signals, an evaluation array 14 which forms digital color measurement data from the electrical signals, and a controller 20 for the illumination array and for automatically taking the individual measurements and identifying the color measurement fields from the color measurement data obtained during the individual measurements. The hand-held color measurement device is also equipped with a distance sensor 15 which cooperates with the controller 20 and detects the position of the hand-held color measurement device relative to the color measurement chart during each individual measurement. In addition, the controller 20 preferably also contains an interface 16 for communicating with an external computer H. Data and control commands can be exchanged with the external computer H via said interface. The controller 20 calculates the positions of the color measurement fields in the respective row of color measurement fields from the color measurement data and the positions of the device. The first type of illumination light, typically white light, which is generated by the portion 11a of the illumination array covers a sufficient portion of the spectrum to enable the color measurement fields to be identified from the color measurement data. The second type of illumination light, which is generated by the portion 11b of the illumination array, does not cover a sufficient portion of the spectrum for identifying the fields and is typically UV light. To this extent, the hand-held color measurement device HMD in accordance with the invention corresponds to the known devices of this type, such as are described in all their details in the prior-art documents mentioned at the beginning. The person skilled in the art does not therefore require a more detailed explanation in this respect. The difference between the hand-held color measurement device in accordance with the invention and the known prior art is the particular design of the controller 20 for implementing the functionalities required in order to perform the method in accordance with the invention. This will be discussed again below in more detail.

When gauging a color measurement chart by means of a hand-held color measurement device, it is necessary to identify the individual color measurement fields in order to be able to correctly assign the ascertained color measurement data to them. In measurements using illumination light of a restricted spectral range, in particular UV light only, it is however difficult to impossible to identify the color measurement fields on the basis of the measurement data, since this requires a sufficient difference in the reflection of the adjacent color fields in the relevant restricted spectral range, specifically the UV range. This can possibly be achieved by suitably embodying and arranging the color measurement fields, but results in a massive restriction in the configuration freedom for the test chart.

This problem is eliminated by the method in accordance with the invention, by scanning each row of color measurement fields twice, once using illumination light having a spectral coverage which is sufficient for identifying the color fields on the basis of the color measurement values, and once using illumination light of the restricted spectral range, specifically UV light, wherein it is particularly expedient and advantageous to scan the respective rows of color measurement fields in two mutually opposite directions.

The color measurement chart is thus gauged in rows and in two measurement runs per row of color measurement fields. In a first measurement run, the hand-held measurement device HMD is guided in a first direction (the arrow D1 in FIG. 1) over the color measurement fields P of the row of color measurement fields to be gauged, wherein the controller 20 activates the portion 11a of the illumination array, such that the measurement object—i.e. the row of color measurement fields—is exposed to a first, white illumination light and/or more generally to a first illumination light having a spectral coverage which is sufficient for identifying the fields. During the first measurement run, the controller 20 triggers a multitude of consecutive individual measurements at short intervals and stores the first color measurement data thus obtained. The distance sensor 15 simultaneously detects, for each individual measurement, the respective position of the hand-held color measurement device HMD relative to a reference position. The color measurement fields are then identified from the stored first color measurement data and the corresponding measured positions of the device, in a way which is known in its own right, and assigned to the corresponding measured positions of the device. The positions of the device which lie within the identified color measurement fields are referred to in the following as the positions of the color measurement fields.

In the subsequent second measurement run, the hand-held measurement device HMD is guided back over the color measurement fields P of the row of color measurement fields to be gauged, in the opposite direction (the arrow D2 in FIG. 1), into its original starting position, wherein the controller 20 activates the portion 11b of the illumination array, such that the row of color measurement fields is only exposed to UV illumination light and/or more generally to a second illumination light of the restricted spectral range which is not sufficient for identifying the fields. During the second measurement run, the controller 20 again triggers a multitude of consecutive individual measurements at short intervals and stores the second color measurement data thus obtained, wherein the distance sensor 15 again detects, for each individual measurement, the respective position of the hand-held color measurement device HMD relative to the reference position. The measurement data and the positions of the device during the corresponding individual measurements are then available, for both types of illumination, for each color measurement field. The second color measurement data measured in the second measurement run can then be unambiguously assigned to the respective color measurement fields on the basis of the positions of the color measurement fields as ascertained from the first measurement run.

Figure 4:
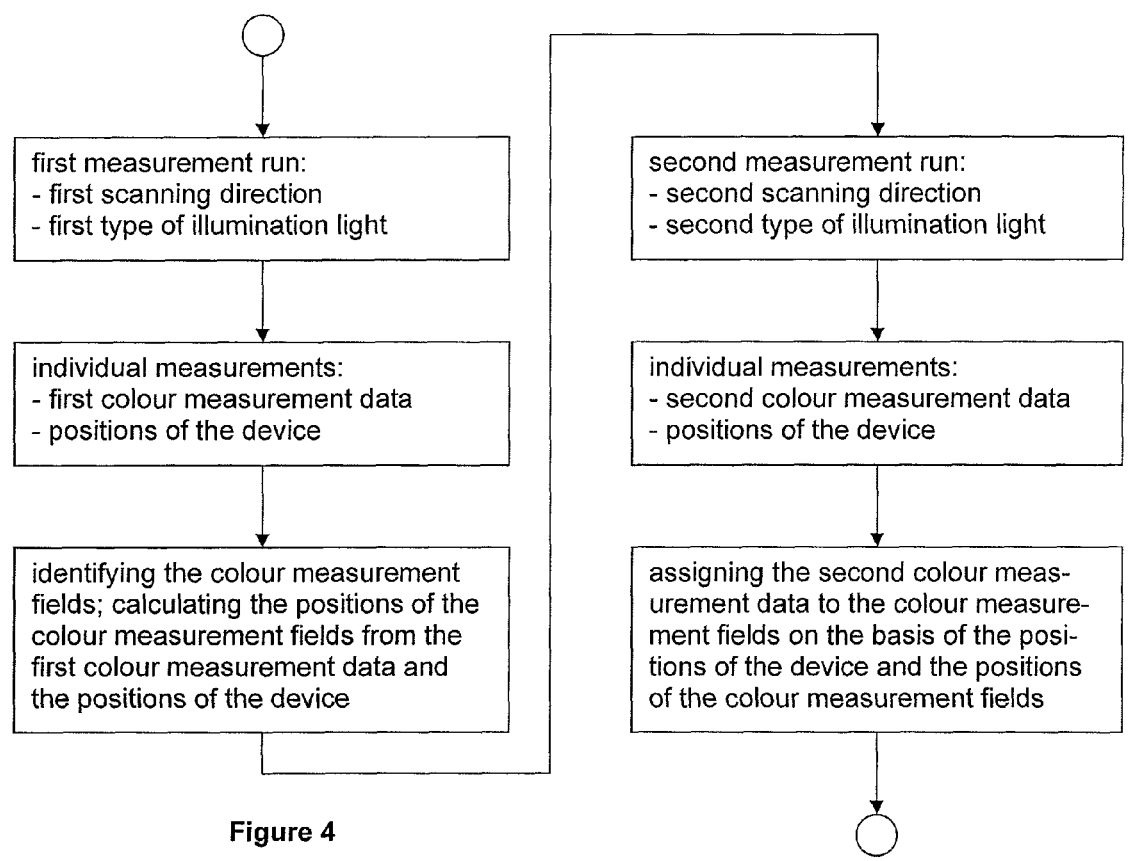
FIG. 4 shows a schematic flow diagram of a cycle of the method in accordance with the invention.

FIG. 4 illustrates the cycle of the method in accordance with the invention, as described above, which applies for gauging a respective row of color measurement fields, in the form of a schematic block diagram. The method cycle is repeated for each row of color measurement fields until all the rows of the color measurement chart which are of interest have been gauged.

The steps of identifying the color measurement fields from the first color measurement data and the corresponding positions of the device during the first measurement run, and assigning the second color measurement data—obtained in the second measurement run—to the color measurement fields can be performed either by the controller 20 itself or completely or partially by corresponding data processing in the external computer H, wherein the step of identifying the color measurement fields from the first color measurement data and the corresponding positions of the device during the first measurement run can be performed even before the second measurement run or also not until after the second measurement run or even not until after all the rows of color measurement fields of the color measurement chart which are of interest have been completely gauged.

If the step of identifying the color measurement fields from the first color measurement data and the corresponding positions of the device during the first measurement run is performed before the second measurement run, the step of gauging the color measurement fields in the second measurement run can also be restricted to the positions of the color measurement fields as ascertained in the first measurement run.

Computer program elements of the invention may be embodied in hardware and/or software (including firmware, resident software, micro-code, etc.). The computer program elements of the invention may take the form of a computer program product which may be embodied by a computer-usable or computer-readable storage medium comprising computer-usable or computer-readable program instructions, "code" or a "computer program" embodied in said medium for use by or in connection with the instruction executing system. Within the context of this application, a computer-usable or computer-readable medium may be any medium which can contain, store, communicate, propagate or transport the program for use by or in connection with the instruction executing system, apparatus or device. The computer-usable or computer-readable medium may for example be, but is not limited to, an electronic, magnetic, optical, electromagnetic, infrared or semiconductor system, apparatus, device or medium of propagation, such as for example the Internet. The computer-usable or computer-readable medium could even for example be paper or another suitable medium on which the program is printed, since the program could be electronically captured, for example by optically scanning the paper or other suitable medium, and then compiled, interpreted or otherwise processed in a suitable manner. The computer program product and any software and/or hardware described here form the various means for performing the functions of the invention in the example embodiment(s).

Although the invention has been shown and described with respect to one or more particular preferred embodiments, it is clear that equivalent amendments or modifications will occur to the person skilled in the art when reading and interpreting the text and enclosed drawing(s) of this specification. In particular with regard to the various functions performed by the elements (components, assemblies, devices, compositions, etc.) described above, the terms used to describe such elements (including any reference to a "means") are intended, unless expressly indicated otherwise, to correspond to any element which performs the specified function of the element described, i.e. which is functionally equivalent to it, even if it is not structurally equivalent to the disclosed structure which performs the function in the example embodiment(s) illustrated here. Moreover, while a particular feature of the invention may have been described above with respect to only one or some of the embodiments illustrated, such a feature may also be combined with one or more other features of the other embodiments, in any way such as may be desirable or advantageous for any given application of the invention.

What is claimed is:

1. A method for gauging a color measurement chart which includes at least one row of adjacently arranged color measurement fields, using a hand-held color measurement device which is moved over the color measurement fields in the row and gauges the color measurement fields in a multitude of individual measurements, wherein: the hand-held color measurement device is guided over the color measurement fields in the row in two measurement runs; in a first measurement run, first color measurement data of the color measurement fields is measured using a first type of illumination light, and the fields are identified on the basis of the first color measurement data, wherein the first type of illumination light covers a sufficient portion of the spectrum to enable the fields to be identified by means of the first color measurement data; and in a subsequent second measurement run, second color measurement data of the color measurement fields is measured using a second type of illumination light which does not cover a sufficient portion of the spectrum for identifying the fields, and the second color measurement data is assigned to the color measurement fields on the basis of the fields identified in the first measurement run.

2. The method according to claim 1, wherein the hand-held color measurement device is moved over the color measurement fields in the row by means of a guide.

3. The method according to claim 1, wherein during the second measurement run, the hand-held color measurement device is guided over the color measurement fields in the row in a direction which is opposite to the movement direction during the first measurement run.

4. The method according to claim 1, wherein: in the first measurement run, the relative position of the hand-held color measurement device is measured for each individual measurement, and the positions of the device are assigned to the color measurement fields; and in the second measurement run, the relative position of the hand-held color measurement device is measured for each individual measurement and the second color measurement data is assigned to the color measurement fields on the basis of the positions of the device as measured in the first and second measurement run.

5. The method according to claim 1, wherein substantially UV light is used as the second type of illumination light.

6. A hand-held color measurement device, designed for scanning operations, for colourmetrically gauging the color measurement fields of a color measurement chart, wherein in said scanning operations, the hand-held color measurement device is guided over a row of color measurement fields of the color measurement chart and automatically takes a multitude of individual measurements, said hand-held color measurement device comprising: an illumination array for exposing the color measurement chart to a first and a second type of illumination light; a pick-up array for capturing the measurement light reflected back from the color measurement fields; a converter array which converts the captured measurement light into corresponding electrical signals; an evaluation array which forms digital color measurement data from the electrical signals; and an electronic controller for the individual measurements and the illumination array and for identifying the color measurement fields from the color measurement data, wherein the first type of illumination light covers a sufficient portion of the spectrum to enable the color measurement fields to be identified from the color measurement data, and the second type of illumination light does not cover a sufficient portion of the spectrum for identifying the fields, wherein the controller is designed to gauge the color measurement fields using the first type of illumination light and identify the color measurement fields from first color measurement data thus obtained, during a first measurement run in which the hand-held color measurement device is guided over a row of color measurement fields in a first direction, and to gauge the color measurement fields using the second type of illumination light and determine second color measurement data and assign the second color measurement data to the color measurement fields on the basis of the color measurement fields identified in the first measurement run, during a subsequent second measurement run in which the hand-held color measurement device is guided over the row of color measurement fields in a second direction.

7. The hand-held color measurement device according to claim 6, wherein the hand-held color measurement device is guided over the row of color measurement fields of the color measurement chart by means of a guide.

8. The hand-held color measurement device according to claim 6, wherein the first and second directions are opposite directions, and wherein the controller is designed to gauge the color measurement fields in two opposite movement directions of the hand-held color measurement device.

9. The hand-held color measurement device according to claim 6, wherein: it comprises a distance sensor which cooperates with the controller and measures the relative position of the hand-held color measurement device for each individual measurement in the first measurement run; the controller assigns the positions of the hand-held color measurement device to the color measurement fields; the distance sensor measures the relative position of the hand-held color measurement device for each individual measurement in the second measurement run; and the controller assigns the second color measurement data to the color measurement fields on the basis of the positions of the device as measured in the first and second measurement run.

10. The hand-held color measurement device according to claim 6, wherein the illumination array provides UV light as the second type of illumination light.

11. A computer program stored on a machine-readable medium in a non-transitory form for gauging a color measurement chart which includes at least one row of adjacently arranged color measurement fields in a multitude of individual measurements, comprising: code for gauging the color measurement fields in the row in two measurement runs including code for measuring first color measurement data of the color measurement fields in a first measurement run using a first type of illumination light, and identifying the fields on the basis of the first color measurement data, wherein the first type of illumination light covers a sufficient portion of the spectrum to enable the fields to be identified by means of the first color measurement data; and code for measuring second color measurement data of the color measurement fields in a subsequent second measurement run using a second type of illumination light which does not cover a sufficient portion of the spectrum for identifying the fields, and assigning the second color measurement data to the color measurement fields on the basis of the fields identified in the first measurement run.

12. The computer program according to claim 11, comprising code for gauging during the second measurement run, the color measurement fields in the row in a direction which is opposite to the direction during the first measurement run.

13. The computer program according to claim 11, comprising code for: measuring the relative position of a hand-held color measurement device, which is used for gauging the color measurement fields, for each individual measurement in the first measurement run, and assigning the positions of the device to the color measurement fields; and measuring the relative position of the hand-held color measurement device for each individual measurement in the second measurement run and assigning the second color measurement data to the color measurement fields on the basis of the positions of the device as measured in the first and second measurement run.

14. The computer program according to claim 11, comprising code for using substantially UV light as the second type of illumination light.

* * * * *